Feb. 3, 1959
W. D. AUTRY
2,872,159
REAMER
Filed May 24, 1956
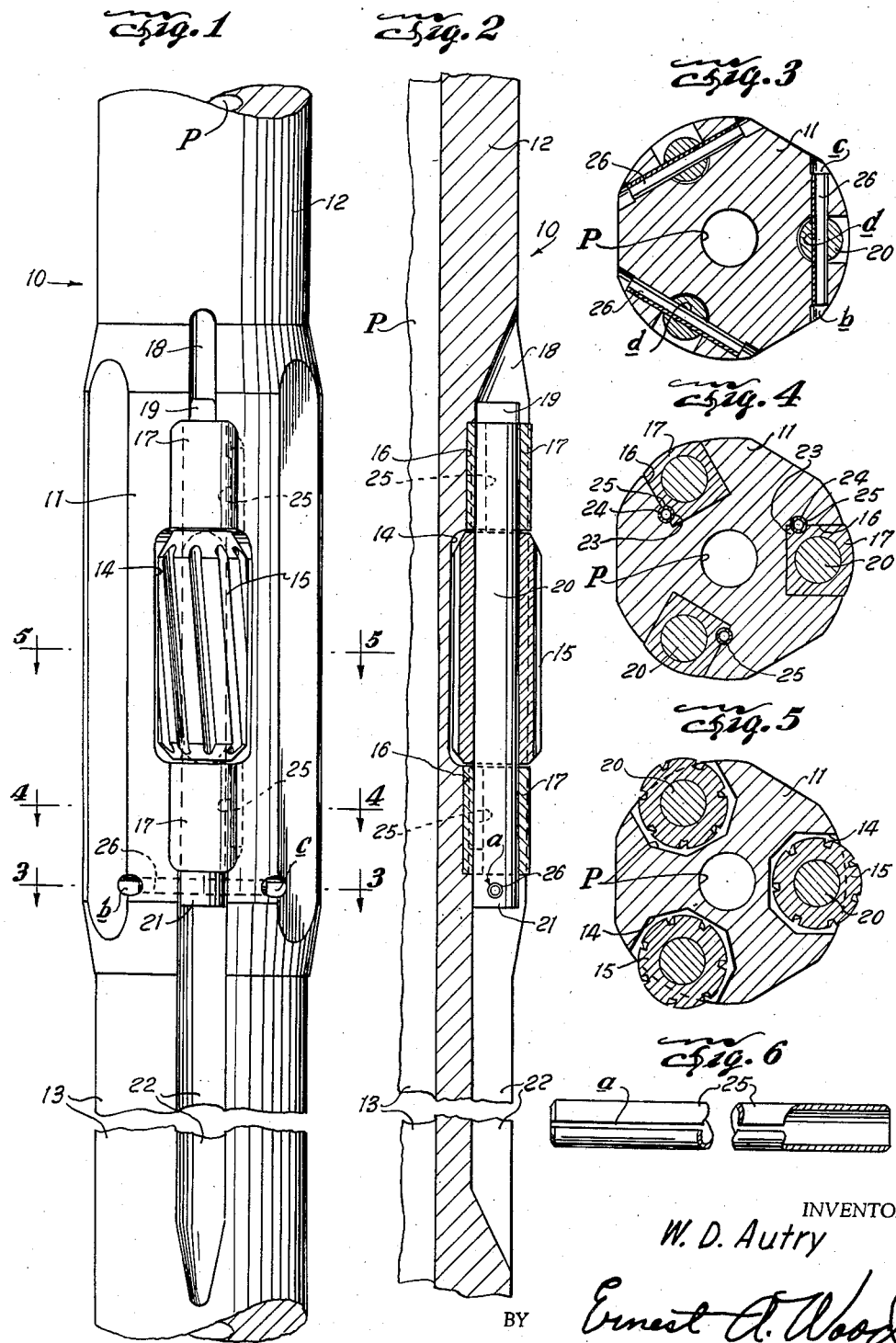
INVENTOR
W. D. Autry
BY Ernest A. Wood
ATTORNEY

United States Patent Office 2,872,159
Patented Feb. 3, 1959

2,872,159

REAMER

Walter D. Autry, Odessa, Tex.

Application May 24, 1956, Serial No. 586,962

1 Claim. (Cl. 255—73)

This invention relates to reamers commonly used in deep well drilling and more particularly to new and useful improvements in the means for mounting the rotary cutters in a reamer body.

There are many and varied types of reamer bodies and cutters but are characteristically similar insofar as they usually consist of an elongate, generally cylindrical body with longitudinally coextensive and circumferentially spaced recesses and with rotary chert cutters mounted on shafts journaled in bearing blocks set into the body at each end of each elongate recess. The differences in these reamers, for the most part, reside in the various means for demountably holding the rotary cutters in their respective recesses in the reamer body and in the majority of cases, these mounting devices require the use of screws, threaded bolts, nuts and other fastening elements likely to become loosened under the excessive vibration and shocks to which deep hole reamers are generally subjected.

It is the principal object of the present invention to insure against loosening or loss of reamer cutters or associated parts in the hole by providing securing means for the cutters or specifically the cutter bearing blocks which are immune to the effects of shocks or vibration to the extent that they may become loose and permit the cutters to be dislodged from their respective recesses and further, a securing means which may be quickly installed without special tools or equipment and as quickly removed for the replacement or interchange of cutters.

Another object of the invention is to replace the less secure cutter holding devices enumerated by a longitudinally split tubular key of spring steel adapted to occupy aligned holes made in the reamer body to traverse the cutter recess at its lower end and with which a diametrical hole in the cutter shaft is brought into register, the inherent spring-back of the tubular key being all that is required to prevent longitudinal displacement of the key in the holes.

Still another object of the invention is to utilize split tubular keys of spring steel for holding the upper and lower bearing blocks of the cutters in their respective recesses, said pins each occupying matching grooves in a bearing block and a wall of a recess in which it reposes.

Other objects will become manifest as the description proceeds when considered with the annexed drawing wherein:

Fig. 1 is a side elevational view of a reamer showing the locking key arrangement for a roller cutter.

Fig. 2 is a fragmentary longitudinal sectional view.

Fig. 3 is a transverse section taken on line 3—3 of Fig. 1.

Fig. 4 is a transverse section taken on line 4—4 of Fig. 1.

Fig. 5 is a transverse section taken on line 5—5 of Fig. 1, and

Fig. 6 is a detail view, partly in section, showing one of the split tubular locking keys.

Continuing with a more detailed description of the drawing, reference numeral 10 denotes generally the body of the reamer which is more or less conventional and which is provided with an axial fluid passage P. The intermediate portion 11 is formed with shank portions 12 and 13 which are provided with a threaded pin and box, respectively (not shown), for incorporation of the body in a drill string.

Circumferentially spaced about the intermediate portion 11 of the body 10 is a series of elongate cavities 14 which accommodate the chert cutters 15. Each cavity 14 has a communicating recess 16 at each end which is substantially square in transverse section to receive the correspondingly shaped bearing blocks 17.

The upper bearing block recess 16 has a longitudinally aligned slot 18 communicating therewith which extends upwardly into the reamer body 10 and is of greater depth than width in order to receive the flattened upper end 19 of a cutter shaft 20 on which rotates freely a cutter 15. The lower end 21 of each cutter shaft 20 extends into an elongate longitudinal slot 22 whose length is slightly greater than the length of the shaft 20 in order that the latter may be placed in the slot 22 and slid longitudinally therein and through the axial bore of a cutter 15 placed in the cutter cavity 14, the upper end 19 of the shaft extending on into the slot 18 above the cavity 14.

Before inserting the cutter shaft 20 in the manner above stated, the bearing blocks 17 are installed in their respective recesses 16. To hold the bearing blocks in place, each has a semi-circular groove 23 (Fig. 4) which matches with a semi-circular groove 24 in the adjacent wall of the bearing block recess 16. A tubular key 25 (Fig. 6) which is split longitudinally as at $a$ is driven into the keyway formed jointly by the two confronting grooves 23 and 24. The diameter of the spring steel key 25 is slightly greater than the diameter of the opening or keyway defined by the two grooves 23 and 24 so that the spring-back of the tubular key will insure positive holding action and will prevent longitudinal displacement of the key 25.

When the shaft 20, bearing blocks 17 and cutter 15 are all assembled as shown, a split tubular key 26 identical to key 25 except as to dimensions, is driven through registering bores $b$ and $c$ in the intermediate portion 11 of the body 12 on opposite sides of the elongate slot 22 and through a bore $d$ in the end 21 of the shaft 20. The tubular key 26 is slightly greater in diameter than the bores $b$, $c$ and $d$ and is controlled when driven through these bores so that expanding effort of the key will positively hold the same against longitudinal displacement. The keys 26 retain the lower ends of the cutter shafts 20 while the upper ends are held against rotation by the flattened portions 19 engaging the narrow slots 18. The shafts are held intermediate their ends by the bearing blocks 17 which, in turn, are retained in their recesses 16 by the split tubular keys 25. In thus retaining the various parts of the reamer, the latter may be assembled in the field without special tools such as wrenches, screw drivers and the like and it is clearly evident that when properly assembled, the parts of the reamer will not be likely to become displaced due to the tubular split keys 25 and 26 combined with other features of the reamer which make use of such keys possible.

Manifestly, the construction as shown and described is capable of some modification and such modification as may be construed to fall within the scope and meaning of the appended claims is also considered to be within the spirit and intent of the invention.

What is claimed is:

A reamer body having an elongate intermediate portion of greater diameter than its end portions, said intermediate portion having a cutter cavity and connecting bearing block recesses at each end of said cavity, the upper bearing block recess having a communicating slot of greater depth than width extending longitudinally into one of said end portions, the other of said bearing block recesses having a communicating slot extending a greater distance into the other end portion of said reamer body, each of said bearing block recesses having a semi-circular groove in one wall thereof, a bearing block in each of said recesses having a semi-circular groove matching the groove in said recess wall, a longitudinally split sleeve formed of spring steel frictionally occupying said semi-circular grooves jointly to hold said bearing blocks in their respective recesses, a cutter shaft having a flattened end retained in the slot of said upper bearing block recess and having its opposite end lying in the communicating slot of said other bearing block recess, a cutter rotatable on said shaft in said cutter cavity and a longitudinally split sleeve formed of spring steel extending frictionally through registering bores through said body on opposite sides of said communicating slot and said opposite end of said shaft.

References Cited in the file of this patent

UNITED STATES PATENTS

| | | |
|---|---|---|
| 1,940,415 | Harrington et al. | Dec. 19, 1933 |
| 2,022,101 | Wright | Nov. 26, 1935 |
| 2,084,430 | Catland | June 22, 1937 |
| 2,306,492 | Noble | Dec. 29, 1942 |
| 2,648,247 | Schmuziger | Aug. 11, 1953 |
| 2,754,716 | Bourns | July 17, 1956 |

FOREIGN PATENTS

| | | |
|---|---|---|
| 432,696 | Great Britain | 1935 |